(12) United States Patent
Moussa et al.

(10) Patent No.: US 10,387,528 B2
(45) Date of Patent: Aug. 20, 2019

(54) SEARCH RESULTS INTEGRATED WITH INTERACTIVE CONVERSATION SERVICE INTERFACE

(71) Applicant: Microsoft Technology Licensing, LLC, Redmond, WA (US)

(72) Inventors: Mohammed Mustafa Mohammed Moussa, Cairo (EG); Ahmed Tarek Abd El-Ghany Hindam, Cairo (EG)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 15/384,990

(22) Filed: Dec. 20, 2016

(65) Prior Publication Data
US 2018/0173714 A1    Jun. 21, 2018

(51) Int. Cl.
| | |
|---|---|
| *G06F 16/00* | (2019.01) |
| *G06F 16/958* | (2019.01) |
| *G06F 17/27* | (2006.01) |
| *G06F 17/22* | (2006.01) |
| *G06N 3/00* | (2006.01) |
| *G06F 16/248* | (2019.01) |
| *G06F 16/951* | (2019.01) |
| *G06F 16/9038* | (2019.01) |

(52) U.S. Cl.
CPC .......... *G06F 16/958* (2019.01); *G06F 16/248* (2019.01); *G06F 16/9038* (2019.01); *G06F 16/951* (2019.01); *G06F 17/2247* (2013.01); *G06F 17/279* (2013.01); *G06N 3/006* (2013.01)

(58) Field of Classification Search
CPC .......... G06F 17/3089; G06F 16/958

USPC .......... 707/706, 722, 723; 709/207
See application file for complete search history.

(56) References Cited

U.S. PATENT DOCUMENTS

| | | | |
|---|---|---|---|
| 6,754,647 B1 | 6/2004 | Tackett et al. | |
| 2005/0138132 A1* | 6/2005 | Zhou ................ | H04L 51/04 709/207 |
| 2008/0071620 A1 | 3/2008 | Lowe | |

(Continued)

FOREIGN PATENT DOCUMENTS

WO    2008061121 A2    5/2008

OTHER PUBLICATIONS

"System and Method for Non-disruptive Conversational Search Box", In Publication of IP.com, Prior Art Database Technical Disclosure, IP.com No. IPCOM000247184D, Aug. 15, 2016, 6 Pages.

(Continued)

*Primary Examiner* — Chelcie L Daye
(74) *Attorney, Agent, or Firm* — Holzer Patel Drennan

(57) ABSTRACT

A search service returns one or more search results identified based on a search query received from a user. At least one search result includes a reference to an interactive conversation service. A search result user interface support manager generates a search results user interface page including an interactive conversation user interface to the interactive conversation service identified by the reference. The assembled search results user interface page is returned to the user such that the user can interact with the one or more search results including the interactive conversation service user interface. The interactive conversation service user interface may present a contextualized response that is generated based on the query or the one or more search results.

21 Claims, 8 Drawing Sheets

(56) References Cited

U.S. PATENT DOCUMENTS

| | | | |
|---|---|---|---|
| 2009/0265317 A1 | 10/2009 | Buehrer et al. | |
| 2009/0281966 A1* | 11/2009 | Biggs | G06F 16/951 706/11 |
| 2011/0066607 A1* | 3/2011 | Wong | G06F 16/24578 707/706 |
| 2013/0173581 A1 | 7/2013 | Kreichman et al. | |
| 2014/0358910 A1* | 12/2014 | Frigon | G06F 16/9038 707/723 |

OTHER PUBLICATIONS

"International Search Report and Written Opinion Issued in PCT Application No. PCT/US2017/065938", dated Feb. 12, 2018, 11 Pages.

McClendon, Bomani, "Getting started with conversational bots using Wit.ai", http://knightlab.northwestern.edu/2016/05/23/getting-started-with-conversational-bots-using-wit-ai/, May 23, 2016, 6 pages.

Slawski, Bill, "How a Search Engine Might Distinguish Between Queries From Bots and From Humans", http://www.seobythesea.com/2009/10/how-a-search-engine-might-distinguish-between-queries-from-bots-and-from-humans/, Oct. 25, 2009, 14 pages.

"IRobot", http://irobotsoft.com/, Jan. 17, 2016, 2 pages.

Chun, Tham Yoke, "World wide web robots: an overview", In Journal of Emerald, vol. 23, Issue 3, 2 pages.

"Bots vs Browsers—Public Bot / User Agent Database & Commentary", http://www.botsvsbrowsers.com/, Feb. 29, 2016, 7 pages.

"Chatterbots and Natural Language Processing: A real example with Brazilian Correios Bot TweetComendas", http://aimotion.blogspot.in/2010/09/chatterbots-and-natural-language.html, Sep. 14, 2010, 7 pages.

\* cited by examiner

SEARCH RESULTS INTEGRATED WITH INTERACTIVE CONVERSATION SERVICE INTERFACE

BACKGROUND

Interactive conversation services such as chatbots, service bots, etc. are configured to simulate conversations with users. Some interactive conversation services can provide services to users. These interactive conversation services allow users to complete tasks such as ordering food, booking flights and hotels, organizing meetings, providing information, generating images, etc. To utilize an interactive conversation service, the user adds the interactive conversation service as a contact in a chat service or application such as Skype or Slack, navigates to a webpage hosting the bot, or downloads a bot application. As the user utilizes the interactive conversation service, the user enters queries or dialogues and the interactive conversation service responds with content or responsive dialogue (e.g., requests for more information).

SUMMARY

In at least one implementation, the described technology is a system for integrating an interactive conversation service user interface into a search results user interface page. The system includes a search service that generates one or more search results responsive to a received search query. The one or more search results include a reference to an interactive conversation service that satisfies the search query. The system further includes a search results user interface support manager that assembles the search results user interface page. The search results user interface page displays the one or more search results including the interactive conversation user interface to the interactive conversation service identified by the reference.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
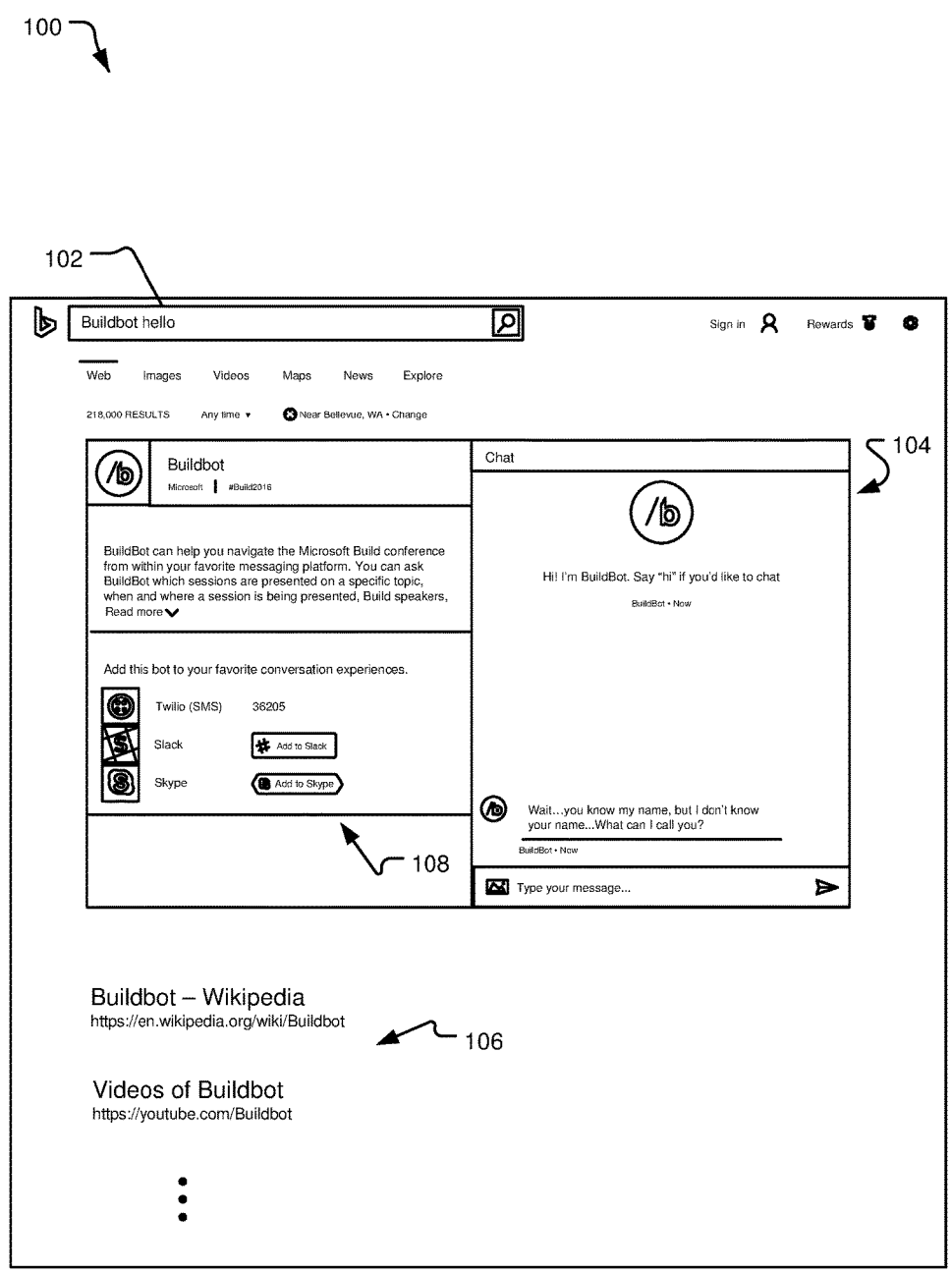
FIG. 1 illustrates an example search results user interface with an integrated interactive conversation service user interface.

One or more implementations described herein provide a system for providing interactive conversation service integrated search results. An interactive conversation service is a chatbot, conversational agent, etc. that may be integrated with services or applications. Such interactive conversation services are configured to simulate conversation with a user, and some interactive conversation services provide services to users. An example of an interactive conversation service is a Hipmunk bot for Skype provided by the Hipmunk travel website. The Hipmunk bot simulates conversation with a user and provides flight discovery and booking services. For example, the user can enter a demand/request such as, "what is the cheapest flight to Seattle in January" through the Skype application to the Hipmunk bot. The Hipmunk bot may respond with a listing of flights to Seattle from the user's location ordered by price, date, etc. Other example interactive conversation services include Buildbot and MurphyBot provided by Microsoft. The Buildbot is an interactive conversation service that is configured to provide information about Microsoft's Build conference. Such information may include the identity of a keynote speaker, the location of a meeting, schedules, etc. The MurphyBot takes what-if scenarios and generates images based on the submitted scenario. For example, a user enters a query "what if Tom Hanks was Will Smith" to the MurphyBot. In response, the MurphyBot finds pictures of Tom Hanks and Will Smith and generates an image depicting a blend between Tom Hanks and Will Smith. Other interactive conversation services may provide medical advice based on identifications of symptoms, concert or sporting event information and ticket purchasing, food ordering services, etc.

To interact with a conversation service, the user navigates (e.g., using a web browser) to a website that hosts the interactive conversation service or adds the interactive conversation service as a contact on a chat application/service such as Skype or Slack. For example, to interact with the above described MurphyBot, the user navigates to the website, https://bots.botframework.com/bot?id=MorphiBot. To interact with the Hipmunk bot, the user adds Hipmunk as a contact through the Skype application/web-service, Slack, etc. Through the website, application, or web-service, the user can interact with the interactive conversation service to trigger content and/or response generation by the interactive conversation service. The content is generated based on the user's query (e.g., dialogue) submitted to the interactive conversation service. Content may include generated images, generated flight listings, a response from the interactive conversation service (such as a question for more information), etc. Such content or response is sometimes referred to herein as a contextual interactive conversation service response.

An example search service described herein provides interactive conversation search services integrated in returned search results. If a user enters a query to a search service (e.g., Google, Bing), then the returned results may include an interactive interface to an interactive conversation service. The interface to the interactive conversation service may be returned as a search result if the interactive conversation service satisfies the user's query. The user may interact with the interactive conversation service interface directly in the returned search results or may navigate to a webpage that hosts the interactive conversation service. Return of an interactive interface to an interactive conversation service is triggered responsive to the user entered query being satisfied by an interactive conversation service.

In one implementation, the query directly identifies an interactive conversation service. For example, the user enters a query "Buildbot Hello." Because the query explicitly identifies the Buildbot interactive conversation service, a search service returns an interactive interface to the Buildbot interactive conversation service with other search results. The user can interact with the interactive interface to the Buildbot directly in the search result interface.

In another implementation, an interactive conversation service satisfies the user entered query based on query intent, signals, or implicit query. For example, if the user enters "what if Tom Hanks was Will smith" to the search service, the search service identifies at least "what if" as being a signal to the MurphyBot interactive conversation service (e.g., an implied call to the MurphyBot), thus satisfying the query. The search service may also identify the user's intent (e.g., to see a combined picture of Tom Hanks and Will Smith). The search service returns an interactive interface to the MurphyBot with generated contextualized response based on the "What if Tom Hanks was Will Smith" query.

In another implementation, an interactive conversation service satisfies a user entered query based on one or more returned search results. In this example implementation, the query does not signal or identify an interactive conversation service. However, the search service analyzes the returned search results (e.g., one or more links from a web search index) to identify a search result context. The search result context is used to determine that an interactive conversation service satisfies the query. For example, if the user enters "what to do in Seattle in March" as a query, a specific interactive conversation service may not be identified based on the query itself. However, the search service may identify one or more travel services, links to book flights to Seattle, etc., as search results. Based on the search results (e.g., the context of the search results), the search service may identify the above described Hipmunk bot as satisfying the query.

When an interactive interface to an interactive conversation service is returned to a user to be displayed on a user device (e.g., through a browser or search service application/facility), the interactive interface is configured to present a contextualized response that is generated based on the entered query. For example, if the user enters the query "what if Tom Hanks is Will Smith," then the MurphyBot interface is returned with an image generated based on the query. Similarly, if the user enters "what to do in Seattle in March," then the Hipmunk bot may be returned listing fights to Seattle in March. The interactive conversation services may receive and store the query and ask subsequent questions. For example, the Hipmunk bot stores Seattle and March as part of the query. The Hipmunk bot may then ask for specific dates, airlines, etc. to further present relevant flights. In some implementations, the generated contextualized response is based on one or more returned search results.

The search service may include a user interface support manager that receives one or more search results generated based on a search query. The one or more search results may include application content results, web search results, local files, interactive conversation services, etc. The user interface support manager may filter, rank, or otherwise modify the search results and create a search results user interface page that includes an interactive conversation user interface to an identified interactive conversation service. The interactive conversation user interface may be an inline frame (iframe) embedded in the search results user interface page. In other implementations, the interactive conversation user interface may be created using an object specified by the search service. As such, the interactive conversation service user interface may be created by populating the object. The object may be returned as part of the assembled search results user interface page. The search results user interface page may be a webpage, application page for the search service, application page for the identified interactive conversation service, or other type of user interface.

FIG. 1 illustrates an example search results user interface with an integrated interactive conversation service user interface. Specifically, FIG. 1 illustrates the user interface 100 with interactive conversation service integrated search results stemming from an explicit call to an interactive conversation service through a search service. In FIG. 1, a user has entered a query 102 ("buildbot hello") into a search field of a search service (e.g., Bing, Google). The query 102 specifically identifies an interactive conversation service (e.g., the buildbot interactive conversation service). As a result, the search service returns and displays an interactive conversation service interface 104 to the interactive conversation service. The interactive conversation service interface 104 is displayed as a search result with other web search results 106. In various implementations, the user may interact directly with the interactive conversation service interface 104 within the search results (e.g., without needing to navigate to another page). In other implementations, the user can select (e.g., click) the interactive conversation service interface 104 such as to navigate to a page that hosts the interactive conversation service user interface 104. In this implementation, the user interacts with the interactive conversation service user interface 104 on the interactive conversation service page.

To display the interactive conversation service user interface 104, the search service recognizes the explicit identification of the interactive conversation service. In this example implementation, the user has specifically identified the interactive conversation service, Buildbot. The search service uses the query 102 to search one or more indexes to identify and return search results associated with content related to the entered query 102. The search service may be configured to search an index of interactive conversation services, which is specifically configured to identify interactive conversation services related to the entered query 102. Because the entered query 102 specifically identifies the interactive conversation service, the search service identifies the interactive conversation service in the interactive conversation service index. The interactive conversation service user interface 104 is returned by the search service as a search result. In various implementations, the interactive conversation service user interface 104 is an inline-frame (iframe) within the displayed search results. In other implementations, the interactive conversation service user interface 104 is returned as a preconfigured object (e.g., a BING object) configured by the search service. Such an object allows interactive conversation service user interfaces to be returned and displayed by the search service. Other implementations are contemplated. In some implementations, the search service does not search a separate interactive service index. Rather, the search service index includes references to the interactive conversation services. The interactive conversation service user interface 104 may include one or more controls 108 for opening the interactive conversation service in other application such as Slack, Skype, etc. The controls 108 may include a download link that allows the user to download the interactive conversation service as a standalone application. The controls 108 may also include a control that navigates a browser to a webpage that includes the interactive conversation service.

In various implementations, two or more interfaces to interactive conversation services may be returned as search results. For example, if two or more interactive conversation services satisfy the query, the interfaces to the interactive conversation services may be displayed in an order of relevancy. The interface may be displayed as a carousel of interactive interfaces such that the user can switch between the interactive interfaces. In other implementations, the two or more interactive interfaces may be displayed in different vertical positions on a display page (e.g., via a browser or application). Other display configurations are contemplated.

The example implementations described provide a user interface that is integrated directly in returned search results. Because a user can interact with the interactive conversation service user interface directly in the returned search results, the user need not navigate to other websites, applications, etc. Thus, the user can browse content more efficiently. Furthermore, because a user interface to the interactive conversation service is returned and the user can directly interact with the interface in the returned search results, less data is processed either locally or through a communication network, which saves processing resources for other uses, both on a user device and a remote search server.

Figure 2:
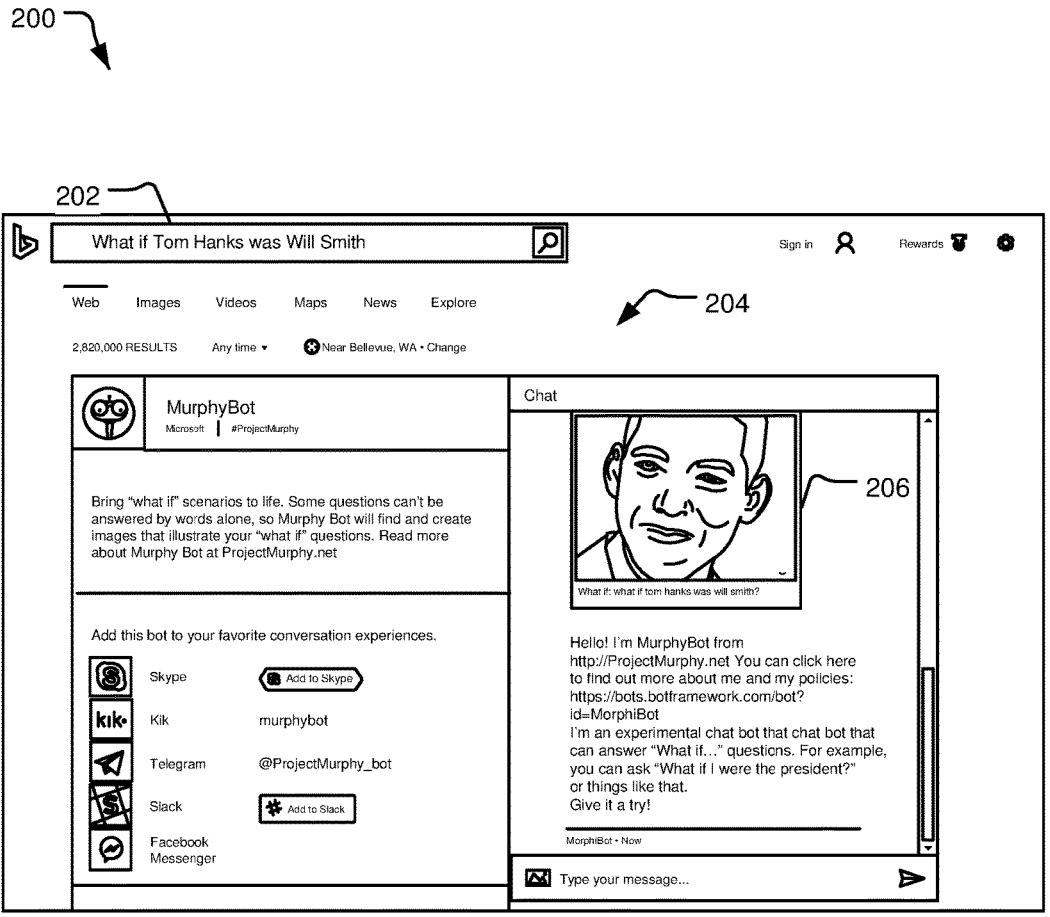
FIG. 2 illustrates another example search results user interface with an integrated interactive conversation service user interface.

FIG. 2 illustrates an example search results user interface 200 with an integrated interactive conversation service user interface. Specifically, FIG. 2 illustrates the user interface 200 with interactive conversation service integrated search results stemming from a search service identifying a query intent (or signal) of a user entered query 202. In FIG. 2, an interactive conversation service user interface 204 is interface to an interactive conversation service called "MurphyBot." MurphyBot is an interactive conversation service that locates one or images (e.g., through a search facility) and morphs or combines the images. As an example, the MurphyBot can locate images of two different persons (e.g., the persons' faces) and morph the images into one image. The MurphyBot interactive conversation service user interface 204 is displayed by the search service responsive to the user entered query 202. The user entered query 202 does not specifically identify the MurphyBot (as was the case in FIG. 1). However, the search service uses the user entered query 202 to identify the interactive conversation service. For example, the search service may be configured to identify the MurphyBot interactive conversation service when a query includes the term "what if" and identifies two people. These terms and combinations in the query can be said to "signal" the MurphyBot. In some implementations, such identification may be based on an identified query intent (e.g., the search service is configured to identify that the user is looking for a combination of the two-identified people). In another example, the user enters a query such as "build conference keynote speaker." The search service is configured to identify that the user is intending to find information on the build conference. Responsive to identifying the query intent, the search service identifies the Buildbot (as described in FIG. 1) as being configured to serve contextualized content and/or responses related to the identified query intent, and thus returns and displays the interactive conversation service user interface to the Buildbot.

Returning to the MurphyBot interactive conversation service user interface 204 illustrated in FIG. 2, the interactive conversation service user interface 204 is displaying a contextualized response 206 that is served by the MurphyBot interactive conversation service responsive to the query. The contextualized response 206 (e.g., a combination of images of Will Smith and Tom Hanks) is served responsive to the query 202 without further interaction with the interactive conversation service by the user. In an example implementation, the search service identifies the MurphyBot interactive conversation service (responsive to the query 202, as described above) then serves the query to the interactive conversation service itself. Thus, the interactive conversation service (MurphyBot) generates content based on the query 202. When the interactive conversation service user interface 204 is returned and displayed, the contextualized response 206 has already been generated by the interactive conversation service and is thus displayed generated without further interaction with the interactive conversation service by the user. Because the contextualized response 206 is generated as a search result and displayed without further user interaction, the user can decide whether to proceed with interacting with the interactive conversation service user interface 204.

Figure 3:
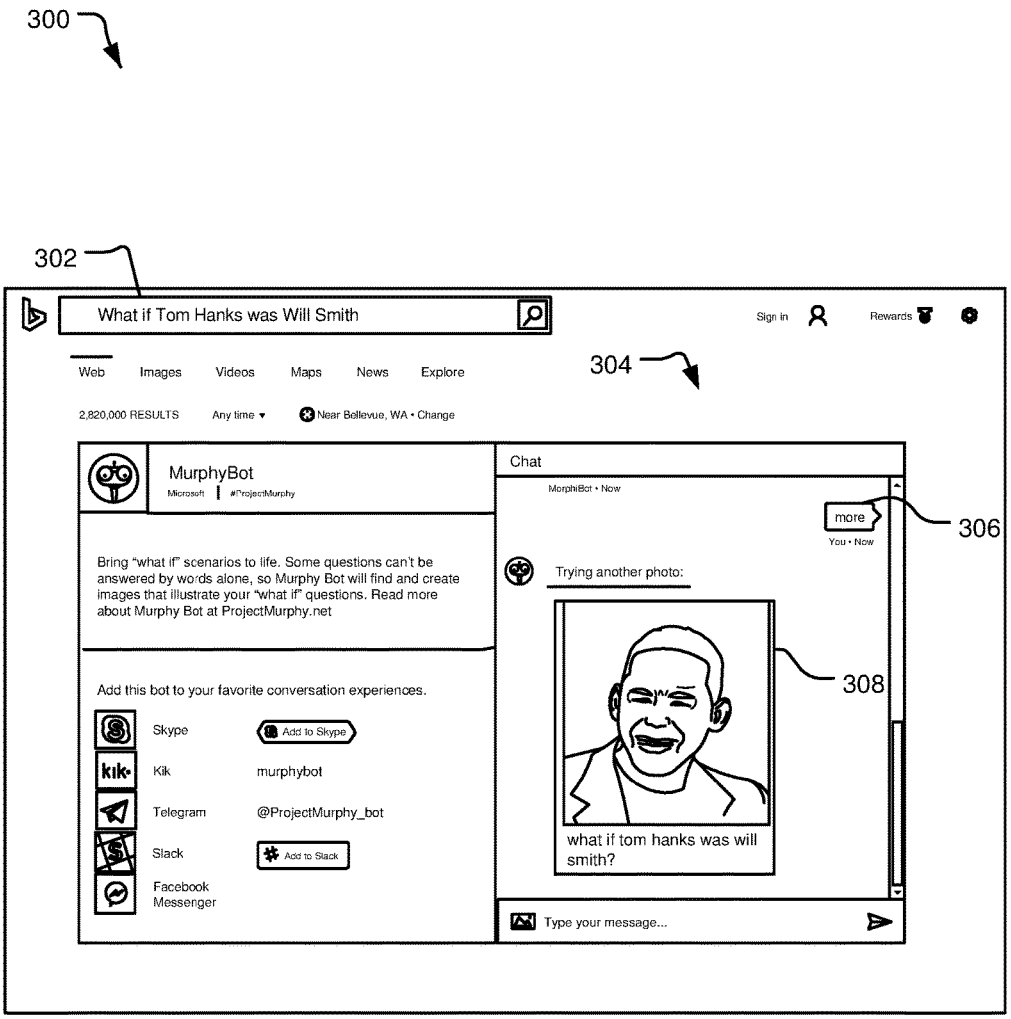
FIG. 3 illustrates another example search results user interface with an integrated interactive conversation service user interface.

FIG. 3 illustrates another example search results user interface 300 with an integrated interactive conversation service user interface. Specifically, FIG. 3 further illustrates FIG. 2 with the user interface 300 including interactive conversation service integrated with search results. As described above, the MurphyBot interactive conversation service was identified based on a query 302. In response, an interactive conversation service user interface 304 is displayed with the search results. In FIG. 3, the user has interacted with the interactive conversation service user interface 304 by entering a command 306 (or dialogue). The command entered by the user is "more." Responsive to the command the interactive conversation service (e.g., MurphyBot) generates another response (e.g., a response 308) based on the query 302. Thus, the user is able to interact with the interactive conversation service via the interactive conversation service user interface 304 directly in the search result pane displayed by the search service. The user need not navigate to another separate page to interact with the interactive conversation service. Furthermore, the interactive conversation service continues to utilize the originally entered query 302 for generating the response 308.

Figure 4:
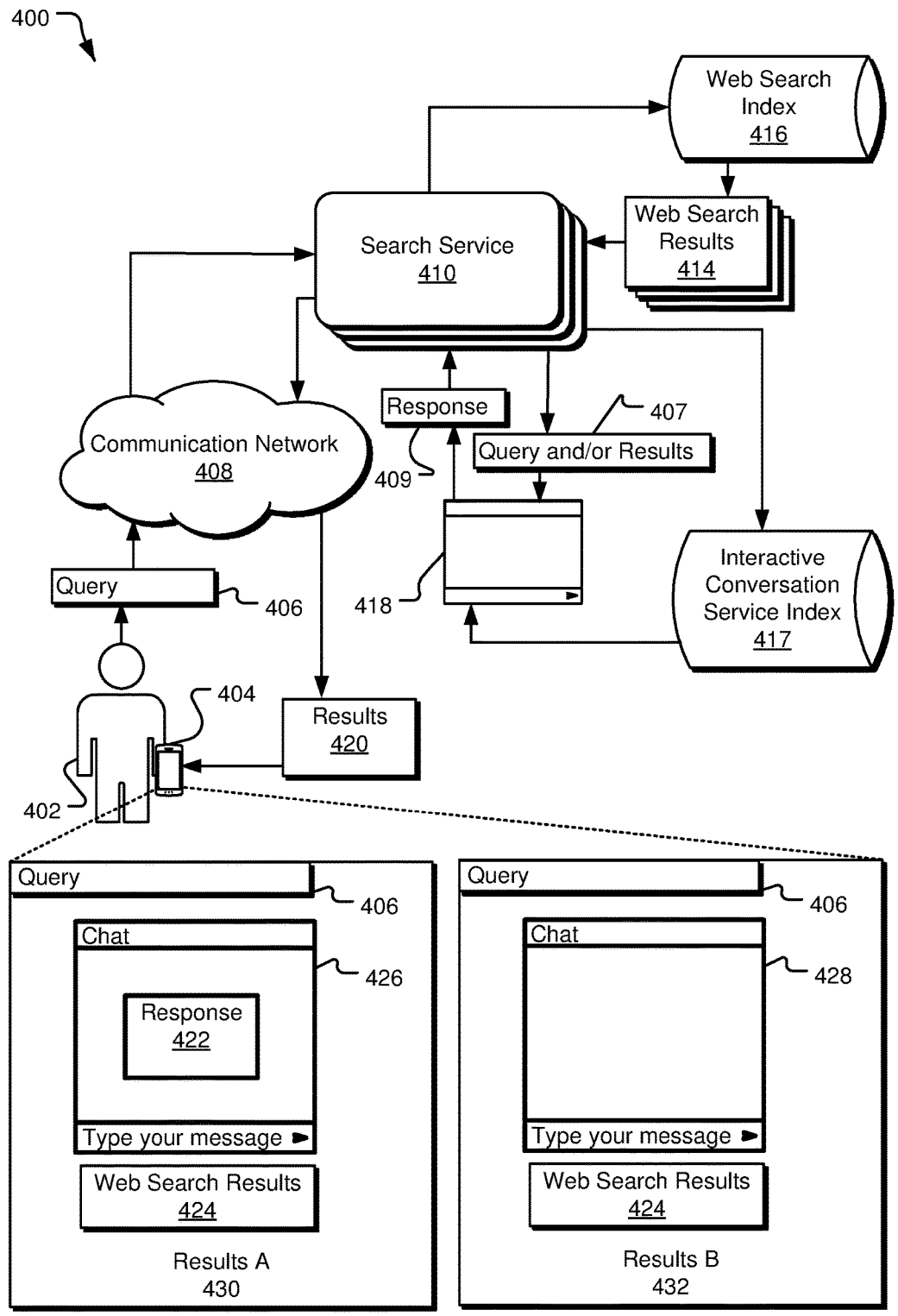
FIG. 4 illustrates an example dataflow diagram for providing interactive conversation service integrated search results.

FIG. 4 illustrates an example dataflow diagram 400 for providing interactive conversation service integrated search results. The dataflow diagram 400 includes a user 402 with a computing device 404. The computing device 404 may be a smart phone, tablet, laptop, desktop computer, gaming device, etc. Using the computing device 404, the user enters a query 406. The query 406 may be entered into a search service webpage through a browser or through an application. The query 406 is passed to a search service 410 (e.g., search service servers) through a communication network 408. The communication network 408 may include a number of elements for facilitating wired or wireless communication including 3G, 4G, long-term evolution (LTE), Wi-Fi, Near Field Communication (NFC), Bluetooth®, Global Positioning System (GPS), and other communication protocol elements. The search service 410 is configured to return one or more search results associated with content satisfying the query 406. The search service 410 utilizes one or more indexes to identify content that satisfies the search query. The indexes may include one or more web search indexes (e.g., a web search index 416) application content indexes, or interactive conversation service indexes (e.g., an interactive conversation service index 417).

FIG. 4 illustrates the web search index 416 and the interactive conversation service index 417 as separate elements, but it should be understood that the indexes may be combined. The query 406 is used to search the web search index 416 to identify one or more web search results 414 associated with web content that satisfies the query 406. The query 406 is further used to search the interactive conversation service index 417 such as to identify one or more interactive conversation services that satisfy the query. The query 406 may be modified, by the search service 410 with classification tags, to correct spelling errors, and/or to generate more relevant results. In various implementations, which are more specifically described with respect to FIG. 5, the web search results 414 identified using the web search index 416 are used to identify one or more interactive conversation services using the interactive conversation service index 417. The query 406 may explicitly identify an interactive conversation service or an interactive conversation service may be identified by the search engine server based on query signals/keywords or an identified query intent. If an interactive conversation service satisfies the query 406, then a reference to an interactive conversation service (e.g., an identified interactive conversation service 418) is received by the search service 410.

A query and/or results 407 is delivered to the identified interactive conversation service such as to generate a contextualized response (e.g., a response 409). The web search results 414 may be analyzed to generate a new query to be delivered to the identified interactive conversations service 418. For example, if the web search results 414 include flight information returned based on the query 406, then the web search results 414 may be analyzed such and a query (or other prompt) may be generated to be delivered to the identified interactive conversation service (e.g., a Hipmunk bot based on the query), such that the Hipmunk bot may provide better flight deals than those presented in the search results. Other contextualized responses based on the query 406 and/or web search results 414 are contemplated. In some implementations, the contextualized response 409 is not generated and a generic response (or prompt) is presented to the user.

The search service 410 generates results 420 based on search results received from the web search index 416 (e.g., the web search results 414), the interactive conversation service index 417 (e.g., the identified interactive conversation service 418). The search service 410 may rank, filter, and otherwise configured the results 420 for presentation as results A 430 or results B 432. It should be understood that the layout of the results A 430 and the results B 432 are for illustrative purposes and that other layouts may be presented. In the results A 430, an interactive conversation service user interface 426 presents a contextualized response 422, along with web search results 424. In the results B 432, an interactive conversation service user interface 428 does not present a contextualized response. Rather the interactive conversation service user interface 428 may present a generic prompt or response. The interactive conversation service user interfaces 426 and 428 may be an inline-frames (iframe) or an object configured by the search service 10. The results A 430 or results B 432 are displayed on the computing device 404 (e.g., via browser or application).

Figure 5:
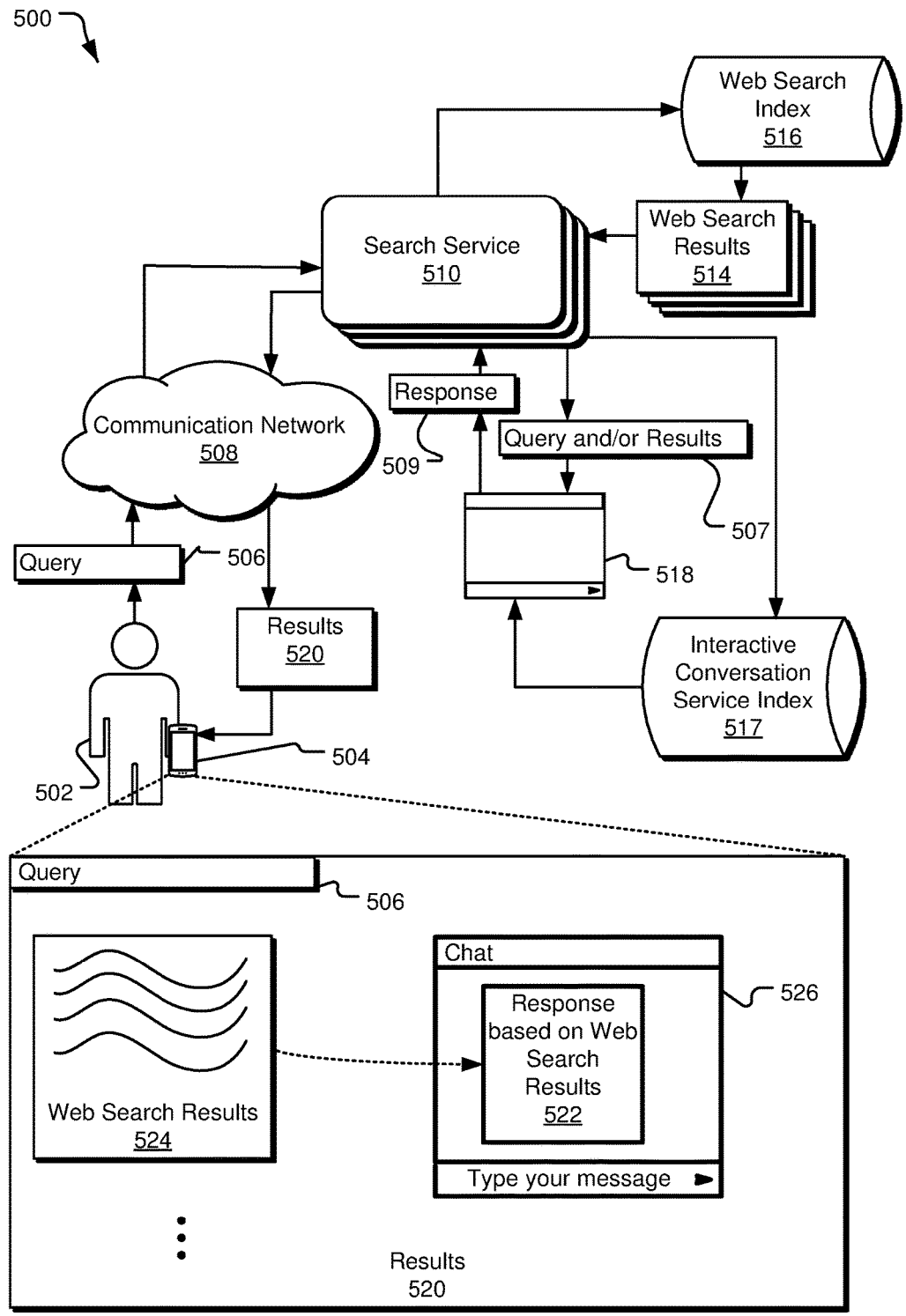
FIG. 5 illustrates another example dataflow diagram for providing interactive conversation service integrated search results.

FIG. 5 illustrates another example dataflow diagram 500 for providing interactive conversation service integrated search results. The dataflow diagram 500 includes a user 502 with a computing device 504. The computing device 504 may be a smart phone, tablet, laptop, desktop computer, gaming device, etc. Using the computing device 504, the user enters a query 506. The query 506 may be entered into a search service webpage through a browser or through an application. The query 506 is passed to a search service 510 (e.g., one or more search service web servers) through a communication network 508. The communication network 508 may include a number of elements for facilitating wired or wireless communication including 3G, 5G, long-term evolution (LTE), Wi-Fi, Near Field Communication (NFC), Bluetooth®, Global Positioning System (GPS), and other communication protocol elements. The search service 510 is configured to return one or more search results associated with content satisfying the query 506. The search service 510 may use one or more indexes to locate content that satisfies the search query. The indexes may include one or more web search indexes (e.g., a web search index 516), application content indexes, and interactive conversation service indexes (e.g., an interactive conversation service index 517).

FIG. 5 illustrates the web search index 516 and the interactive conversation service index 517 as separate elements, but it should be understood that the indexes may be integrated. The query 506 is used to search the web search index 516 to identify one or more web search results 514 associated with content that satisfies the query 506. The query 506 is further used to search the interactive conversation service index 517 such as to identify one or more interactive conversation services that satisfy the query 506. In FIG. 5, no particular interactive conversation service is identified that satisfies the query 506 itself. However, the returned web search results 514 from the search service indicate that an interactive conversation service may satisfy the query 506. For example, the entered query may not be a specific (explicit) identification of an interactive conversation service and/or the query 506 does not have any signals or indicators (or no query intent can be determined) that are associated with any interactive conversation services. However, the returned web search results 514 from the web search index 516 may indicate that an interactive conversation service may be related to (e.g., satisfy) the query 506. The indication may be determined based on a determination that content (or related content) of the web search results 514 is serviceable by an interactive conversation service.

As a specific example, a user enters a query "what to do in Seattle in March." The search service 510 uses the query to identify content that satisfies the query in both the web search index 516 and the interactive conversation service index 517. Initially, an interactive conversation service is not identified based on the query. However, using the web search index 516, the one or more web search results 514 are returned that include content related to booking flights to Seattle in March, for example. The one or more web search results 514 may also include links to book hotels in Seattle in March. Based on these returned search results (e.g., travel booking), the search service 510 may use the results to identify a context of the one or more search results. In this example, the context may be travel booking and thus, the search service 510 identifies the interactive conversation service in the interactive conversation service index 517 related to travel booking (e.g., a bot as a service such as Hipmunk bot). Such identification of the context may be based on a correlation of search results. For example, if the user specifically identifies the Hipmunk bot in a query to the search service, then other search results may be correlated to the search results returned based on the "what to do in Seattle in March" query. Other methods of identifying an interactive conversation service based on search results are contemplated. An interactive conversation service 518 (or a reference to the interactive conversation service) may be returned to the search service 510. Furthermore, as described above with respect to FIG. 4, a query and/or results 507 (or modified query based on results) may be presented to the interactive conversation service 518 to generate a contextualized response 509. Returning to the travel booking example, "March" and "Seattle" may be delivered to the travel booking interactive conversation service 518 such as to generate hotel and flight options for Seattle in March (e.g., as the contextualized response 509). When results 520 are returned to the user 502 (via the computing device 504), an interactive conversation service user interface 526 is displayed along with a contextualized response based on Web search results 522 (e.g., based on the web search results 524). As described above, if the web search results 524 include flight options, then the web search results 524 (or 514) may be presented to the interactive conversation service user interface 518 such as to generate response based on web search results 522 (e.g., contextualized response). The response based on the web search results 522 may include better flight deals, etc.

Figure 6:
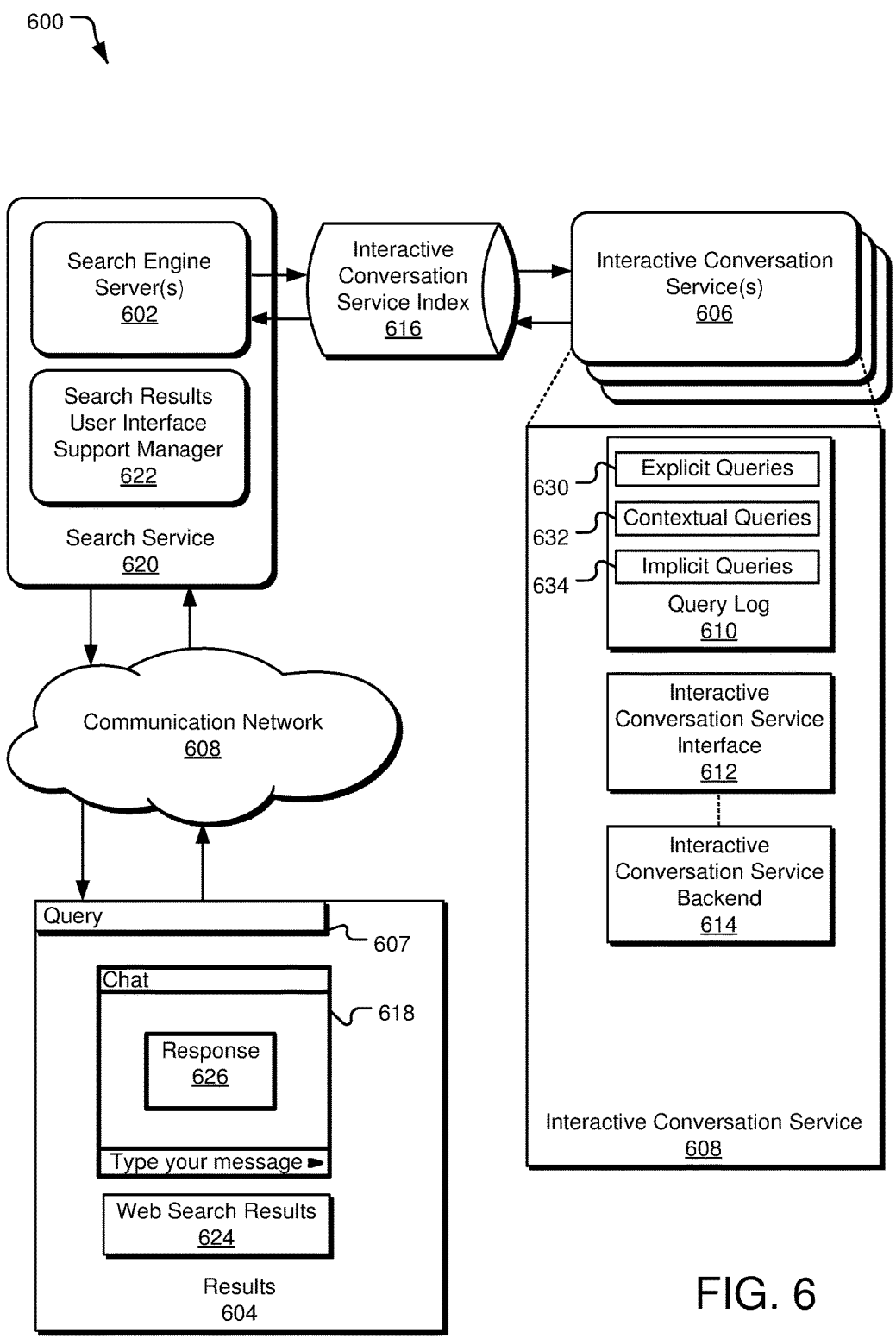
FIG. 6 illustrates a block diagram of an example architecture for providing interactive conversation service integrated search results.

FIG. 6 illustrates a block diagram of an example architecture 600 for providing interactive conversation service integrated search results. The architecture 600 includes a search service 620 with one or more search engine servers 602 configured to receive a query, search one or more indexes (e.g., a web search index (not shown) and an interactive conversation service index 616) and return one or more search results associated with content that satisfies the query. The interactive conversation service index 616 may be managed by an interactive conversation service framework (not shown).

The search engine servers 602 receives a query and searches the interactive conversation service index 616 (and other indexes) based on the received query. The search service 620 may receive one or more search results from the searched indexes including at least one reference to an interactive conversation service 606. The search service 620 includes a search results interface support manager 622 configured to generate results 604 in a manner to be returned to a user (not shown) across a communication network 608. The results 604 include an interactive conversation service user interface 618 to the interactive conversation service 608. The interactive conversation service user interface 618 includes a response 626, which is a contextualized interactive conversation service response.

In various implementations, the search engine servers 602 receive the query 607 (along with possible context information such as marketing information, location information, safe search setting, privacy setting, personalization information, etc.). The query 607 may be considered a generic query, in that it is not limited to Web search results or interactive conversation service search results. The query 607 is input from a client (e.g., through a search application or facility of the client) to a query classifier (not shown) in a cloud computing environment. The query is analyzed, and tags (e.g., classification tags) may be assigned to the query 607. Such classifications may include celebrity query, music query, interactive conversation service query, navigational query, travel query etc. Confidence metrics may be assigned with the tags. The classification tags may be used to influence rankings among search results from one or more search contexts. The classification tags may also be used to determine which indexes (e.g., a web search index and/or an interactive conversation services index) based on the classified search query. The tags may be used to disambiguate search results, thereby grouping, ranking, and filtering search result to provide a more relevant set of search results to the user. Classification tags may also be used to, without limitation, filter, rank, promote, and/or demote, search results including interactive conversation services. Other methods of modifying the query to generate or identify relevant search results are contemplated.

If a reference to an interactive conversation service is not initially returned by searching the one or more indexes, a query may be generated and/or modified based on one or more results returned from a web search. As described above the search service 620 may be configured to identify a context of the search results. As such, the search service 620 may generate and/or modify a query and search the interactive conversation service index 616 using the generated or modified query. Such query modification may include adding a classification tag based on the returned web search results. As described in the example above, the user may enter a query "what to do in Seattle in March," and the query may not initially result in a specific interactive conversation service being identified. However, web results may include one or more results for travel booking services. Based on the received web results, the search service 620 may add travel tags to the query and re-search the interactive conversation service index 616 based on the modified query. Other methods of query modification are contemplated.

The search results interface support manager 622 receives the one or more search results (which may be received from one or more different indexes and integrated) and adds appropriate user interface parameters for delivery to the client (e.g., user). The search results are presented in the client device with integrated rankings, groupings, and other presentation characteristics. The search results interface support manager 622 may receive the reference to the interactive conversation service 608 (e.g., based on the query 607), and generate/populate a search service object configured for the search service 620 to provide a displayed interactive conversation service user interface 618. In other implementations, the search results interface support manager 622 generates an inline frame (iframe) for presenting the displayed interactive conversation service user interface 618. Personalization data, based on user preference and/or historical user behavior (e.g., collected from a clickstream), can be associated with a machine identifier, an account/user identifier, etc. In this manner, the same machine identifier, etc. can be submitted with the query 607 and maintained locally and/or remotely in a user data profile (UDP) for using in refining the ranking and/or grouping of the search results for a particular machine and/or user. The placement and/or presentation of one or more search results (e.g., the results 604) by the search results interface support manager 622 may be arranged by static placement (e.g., top of page, middle of page, bottom of page) or it can be managed by dynamic placement based on ranking and grouping parameters, typically subject to some normalization among different schemes.

The contextualized interactive conversation service response 626 is generated based on the query 607, and/or a query modified by the search service 620. For example, before the interactive conversation service user interface 618 is presented to the user/client, the search service 620 may submit, to the interactive conversations service 608, the query 607 and/or a modified query to generate the contextualized response 626. Such modifications include selecting certain parts of the query 607 to submit to the interactive conversation service 608, adding tags, or modifying the query based on received web search results 624. The query may be modified based on the identified interactive conversation service 608. For example, the search service 620 may be configured to understand certain dialogue parameters of the identified interactive conversation service 608 such that the generated response 626 is relevant, rather than a generic response. The search service 620 analyzes one or more received results and selectively modifies the query to submit to the interactive conversation service 608 based on the one or more received results. In various implementations, the query is modified based on user preferences, past search history, etc. For example, if the user prefers to fly on United Airlines flights, and the Hipmunk bot is returned as a search result, then the flight query may be modified such that the contextualized response 626 displays and/or otherwise ranks per the preference for United Airlines flights. Other methods for generating contextualized responses for an identified interactive conversation service are contemplated.

On a substantially continuous basis, the interactive conversation service framework or search engine servers 602 receive and index or otherwise processes one or more interactive conversation services 606. The interactive conversation service index 616 may be generated based on query logs that are documented by each of interactive conversation services 606. For example, the interactive conversation service 608 includes a query log 610 that records one or more queries that are satisfied by the interactive conversation service 608. If the interactive conversation service 608 (or its interface 612) is returned to a user because of a user's query, and the user interacts with the returned interactive conversation service 608, then the query is recorded in the query log 610. Furthermore, each query in the query log 610 may be weighted. For example, if a user interacts with the returned interactive conversation service 608 for an extended period of time (greater than 4 minutes for example) then the associated query is weighted more than a query associated with a returned interactive conversation service that results in user interaction for less than 4 minutes. Other time thresholds are contemplated. The queries that result in interaction with a returned interactive conversation service may be given greater weight than those queries that do not result in interaction with a returned interactive conversation service. The query log 610 may include explicit queries 630 (e.g., direct identification of the interactive conversation service 608), key words, contextual queries 632 (e.g., signaled or query intent identifications of the interactive conversation service 608), and implicit queries 634 (e.g., the query implicitly holds information that can triggers interactive conversation services).

Each interactive conversation service (e.g., the interactive conversation service 608) includes an interactive conversation service backend 614. The interactive conversation service backend 614 includes instructions for interacting with a user and generating content based on a user query to the interactive conversation service 608. For example, the interactive conversation service backend 614 includes a plurality of dialogues or parameters that are useful for generating content for a user and responding to a user entry. The user may interact with the interactive conversation service 608 (and through the backend) using an API. As such, the returned interface 612 may be an interface for using the API to interact with the interactive conversation service 608.

Figure 7:
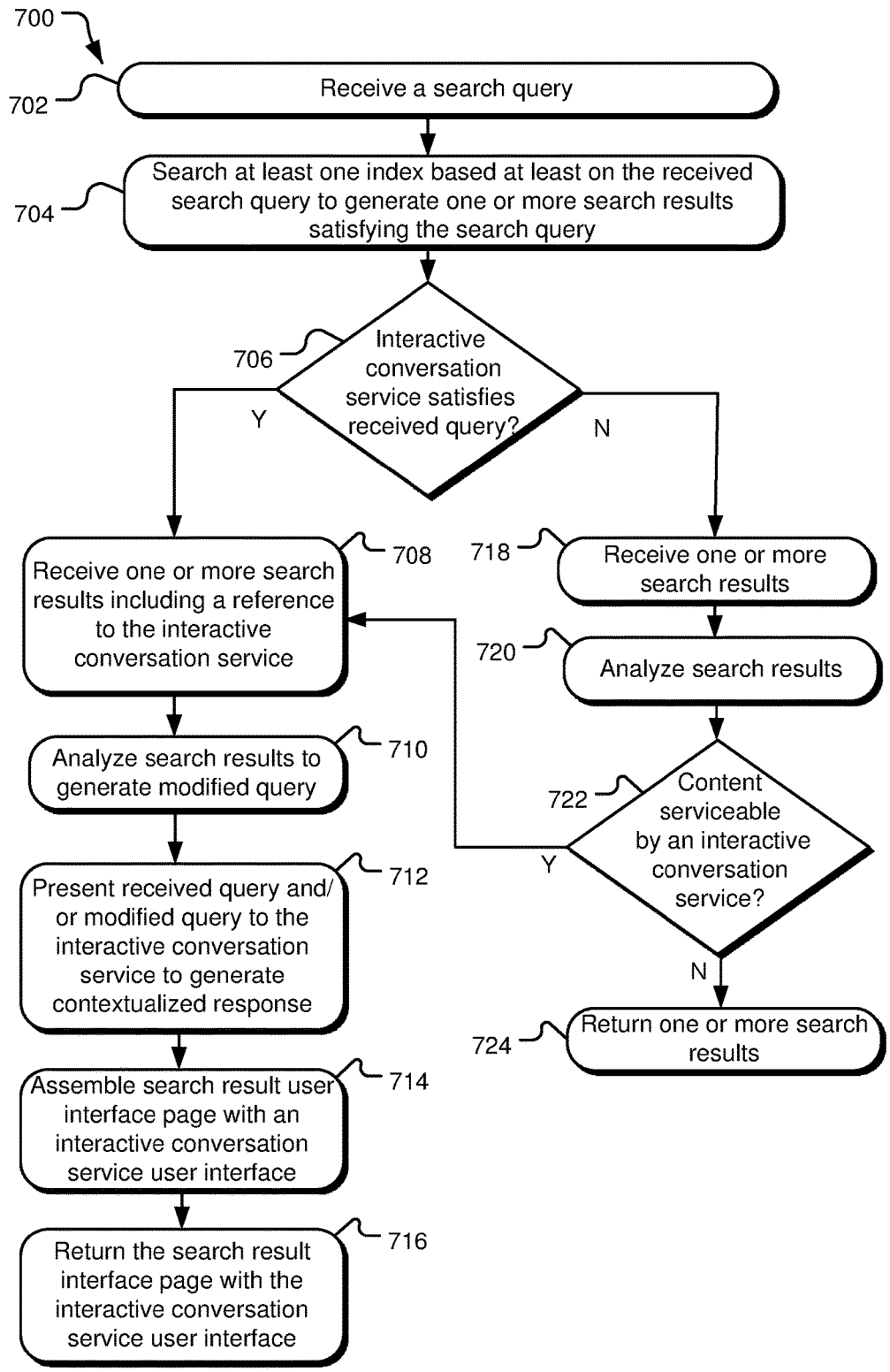
FIG. 7 illustrates example operations for providing interactive conversation service integrated search results.

FIG. 7 illustrates example operations 700 for providing interactive conversation service integrated search results. The operations 700 may be performed by a search service that includes one or more search engine servers and a search results user interface support manager. In other implementations, the search service is an application on a client device that searches locally. A receiving operation 702 receives a search query. The search query is received from a user using a computing device. The query may be received over a communication network or may be received locally on a user device. In response to the received search query, a searching operation 704 searches at least one index based at least on the received search query to generate one or more search results that satisfy the search query. The query may be modified using classification tags, to correct spelling errors, or to generate more relevant search results. The searching operation 704 may search one or more web search indexes, one or more interactive conversation indexes, one or more application content indexes, one or more local client indexes, etc. In searching the one or more indexes, a determining operation 706 determines whether an interactive conversation service satisfies the search query (or modified query). The query may be satisfied based on the at least a portion of the query specifically identifying the interactive conversation service. The query may be satisfied based on the query using keywords (e.g., "what if" for MurphyBot), or an identified query intent or signal (e.g., a query related to travel returns Hipmunk bot).

If an interactive conversation service satisfies the received query, then a receiving operation 708 receives on or more search results, and thus, the results are generated. The one or more search results include a reference to the interactive conversation service. Other search results of the one or more search results may include web search results, application content search results, etc. An analyzing operation 710 analyzes the one or more search results to generate a modified query. The query is modified before it is presented to the identified interactive conversation service such as to generate a contextualized response. For example, if the user enters a query related to flights to Mexico, the Hipmunk bot may be identified as satisfying the query and a reference to the Hipmunk bot may be received by the search service. Furthermore, content related to other search results may include other flight deals (e.g., through another travel service). These results may be analyzed and presented to the Hipmunk bot such that the Hipmunk bot may make counter offers for better flights. These counter offers are considered contextualized interactive conversation service content. As such, a presenting operation 712 presents the received query and/or modified query to the interactive conversation service to generate a contextualized response.

An assembling operation 714 assembles a search results user interface page with an interactive conversation service user interface. The assembling operation may be performed by a search results user interface support manager. The search results user interface support manager may rank, modify, filter, etc. the received search results. Furthermore, the search results user interface support manager may generate or populate a search service object for the interactive conversation service, that serves as the interactive conversation service user interface. For example, the search results user interface support manager may generate an iframe including the interactive user interface to the interactive conversation service. In other implementations, a predefined search service object may be created with interactive conversation service user interface mechanisms. The search results user interface page may be a webpage such as an HTML page, an application page, or another type of user interface page. A returning operation 716 returns search result interface page with the interactive conversation service user interface. In implementations, the interactive conversation service user interface presents the generated contextualized response. In some implementations, no contextualized response is generated or displayed. In this implementation, a generic prompt or cue is presented by the interactive conversation service user interface.

If it is determined that an interactive conversation service does not satisfy the received query in the determining operation 706, a receiving operation 718 receives one or more search results based on other searches such as a web search, application content search, etc. An analyzing operation 720 analyzes the one or more received search results. The analyzing operation is for determining whether the received results include content that may be serviceable by an interactive conversation service. In a specific example described above, the user enters a query, "what to do in Seattle in March," and the search service does not initially identify an interactive conversation service as satisfying the query. However, the results include travel service content. The search service can determine based on the results, that an interactive conversation service exists that is configured to provide travel service. The analyze operation 720 may generate and/or modify the query based on the search results to re-search the interactive conversation service index. As such, a determining operation 722 determines whether content associated with the one or more received search results is serviceable by an interactive conversation service. If the content is not serviceable by an interactive conversation service, then a returning operation 724 returns the one or more search results to the client. The results may be sorted, ranked, positioned, etc., by a search results interface support manager of the search service.

If the results are not serviceable, then the interactive conversation service is identified and receiving operation 708 receives the one or more search results including a reference to the interactive conversation service. After the receiving operation 708, the analyzing operation 710 analyzes the search result to generate a modified query for the identified interactive conversation service. The query and/or modified query is presented to the interactive conversation service in the presenting operation 712 to generate a contextualized response. The generating operation 714 generates the search result interface with the interactive conversation service user interface. The returning operation 716 returns the interactive conversation service user interface with the one or more search results. The interactive conversation service user interface presents the generated contextualized response.

Figure 8:
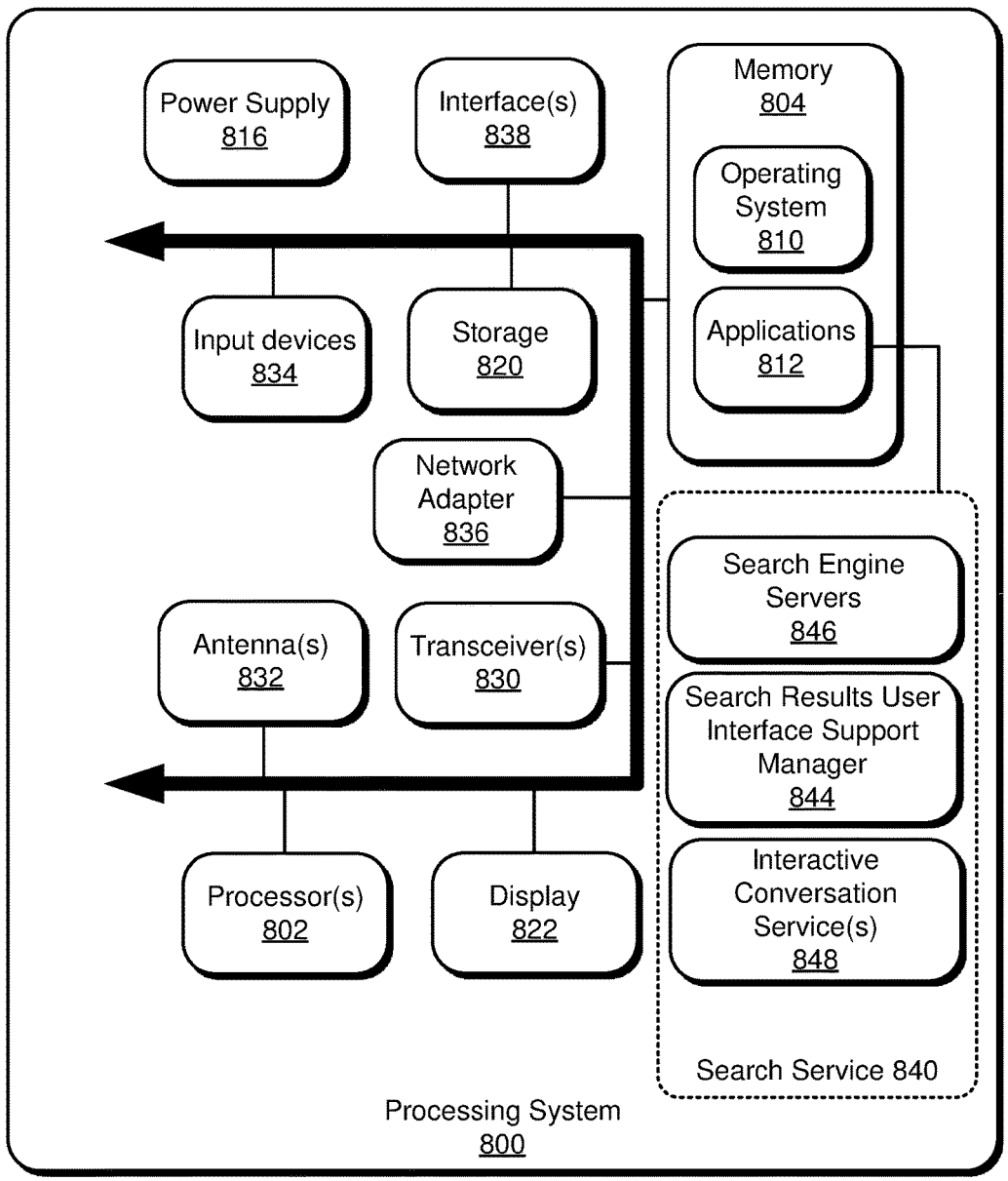
FIG. 8 illustrates an example system that may be useful in implementing the described technology.

FIG. 8 illustrates an example system (labeled as a processing system 800) that may be useful in implementing the described technology. The processing system may be a client device such as a laptop, mobile device, desktop, tablet, or a server/cloud device. The processing system 800 includes one or more processor(s) 802, and a memory 804. The memory 804 generally includes both volatile memory (e.g., RAM) and non-volatile memory (e.g., flash memory). An operating system 810 resides in the memory 804 and is executed by the processor(s) 802.

One or more application programs 812 modules or segments, such as a search service 840 are loaded in the memory 804 and/or storage 820 and executed by the processor(s) 802. The application programs 812 or modules may include the search service 840 implemented by one or more search engine servers 846, search results interface support manager 844, one or more interactive conversation services 848, etc. which may be embodied in instructions stored in the memory 804 and/or storage 820 and executed by the processor(s) 802. Data such query logs, web search indexes, interactive conversation service indices, content, etc. may be stored in the memory 804 or storage 820 and may be retrievable by the processor(s) 802 for use in the by a search service, the search engine servers 846, the search results interface support manager 844, or the one or more interactive conversation services 848, etc. The storage 820 may be local to the processing system 800 or may be remote and communicatively connected to the processing system 800 and may include another server. The storage 820 may store resources that are requestable by client devices (not shown).

The processing system 800 includes a power supply 816, which is powered by one or more batteries or other power sources and which provides power to other components of the processing system 800. The power supply 816 may also be connected to an external power source that overrides or recharges the built-in batteries or other power sources.

The processing system 800 may include one or more communication transceivers 830 which may be connected to one or more antenna(s) 832 to provide network connectivity (e.g., mobile phone network, Wi-Fi®, Bluetooth®, etc.) to one or more other servers and/or client devices (e.g., mobile devices, desktop computers, or laptop computers). The processing system 800 may further include a network adapter 836, which is a type of communication device. The processing system 800 may use the adapter and any other types of communication devices for establishing connections over a wide-area network (WAN) or local-area network (LAN). It should be appreciated that the network connections shown are exemplary and that other communications devices and means for establishing a communications link between the processing system 800 and other devices may be used.

The processing system 800 may include one or more input devices 834 such that a user may enter commands and information (e.g., a keyboard or mouse). These and other input devices may be coupled to the server by one or more interfaces 838 such as a serial port interface, parallel port, universal serial bus (USB), etc. The processing system 800 may further include a display 822 such as a touch screen display.

The processing system 800 may include a variety of tangible computer-readable storage media and intangible computer-readable communication signals. Tangible computer-readable storage can be embodied by any available media that can be accessed by the processing system 800 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 800. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example system for integrating an interactive conversation user interface into a search results user interface includes a search service that generates one or more search results responsive to a received search query. The one or more search results includes a reference to an interactive conversation service. The interactive conversation service satisfies the received search query. The system further includes a search results user interface support manager of the search service that assembles the search results user interface page. The search results user interface page is configured to display the one or more search results including the interactive conversation user interface to the interactive conversation service identified by the reference.

Another example system for integrating an interactive conversation user interface into a search result user interface of any preceding system for integrating an interactive conversation user interface into a search result user interface includes the interactive conversation service generating a contextualized interactive conversation response based on the received search query. The interactive conversation user interface is configured to display the contextualized interactive conversation response.

Another example system for integrating an interactive conversation user interface into a search result user interface of any preceding system for integrating an interactive conversation user interface into a search result user interface includes the interactive conversation service generating a contextualized interactive conversation response based on the generated one or more search results. The interactive conversation user interface is configured to display the contextualized interactive conversation response Another example system for integrating an interactive conversation user interface into a search result user interface of any preceding system for integrating an interactive conversation user interface into a search result user interface includes the interactive conversation service satisfying the received search query based on at least a portion of the received search query identifying the interactive conversation service.

Another example system for integrating an interactive conversation user interface into a search result user interface of any preceding system for integrating an interactive conversation user interface into a search result user interface includes the interactive conversation service satisfying the received search query based on an identified query intent of the received search query.

Another example system for integrating an interactive conversation user interface into a search result user interface of any preceding system for integrating an interactive conversation user interface into a search result user interface includes the interactive conversation service satisfying the received search query based on an identified context of the one or more search results.

Another example system for integrating an interactive conversation user interface into a search result user interface of any preceding system for integrating an interactive conversation user interface into a search result user interface includes the assembled search results user interface page being transmitted to a client device. The client device is configured to display the received search results user interface page including the interactive conversation user interface to the interactive conversation service.

An example method for integrating an interactive conversation user interface into a search results user interface page includes generating one or more search results responsive to a received search query. The one or more search results includes a reference to an interactive conversation service. The interactive conversation service satisfies the received search query. The method further includes assembling the search results user interface page. The search results user interface page is configured to display the one or more search results including the interactive conversation user interface to the interactive conversation service identified by the reference.

Another example method of any preceding method includes the interactive conversation service generating a contextualized interactive conversation response based on the received search query. The interactive conversation user interface is configured to display the contextualized interactive conversation response.

Another example method of any preceding method includes the interactive conversation service generating a contextualized interactive conversation response based on the generated one or more search results. The interactive conversation user interface being configured to display the contextualized interactive conversation response.

Another example method of any preceding method includes the interactive conversation service satisfying the received search query based on at least a portion of the received search query identifying the interactive conversation service.

Another example method of any preceding method includes the interactive conversation service satisfying the received search query based on an identified query intent of the received search query.

Another example method of any preceding method includes the interactive conversation service satisfying the received search query based on an identified context of the one or more search results.

Another example method of any preceding method includes communicating the assembled search results user interface page to a client device, the client device being configured to display the received search results user interface page including the interactive conversation user interface to the interactive conversation service.

A tangible processor-readable storage media embodied with instructions for executing on one or more processors and circuits of a device a process for integrating an interactive conversation user interface into a search results user interface page includes generating one or more search results responsive to a received search query. The one or more search results include a reference to an interactive conversation service. The interactive conversation service satisfies the received search query. The process further includes assembling the search results user interface page. The search results user interface page is configured to display the one or more search results including the interactive conversation user interface to the interactive conversation service identified by the reference.

Another example tangible processor-readable storage media of any preceding tangible processor-readable storage media includes the interactive conversation service generating a contextualized interactive conversation response based on the received search query. The interactive conversation user interface is configured to display the contextualized interactive conversation response.

Another example tangible processor-readable storage media of any preceding tangible processor-readable storage media includes the interactive conversation service generating a contextualized interactive conversation response based on the generated one or more search results. The interactive conversation user interface is configured to display the contextualized interactive conversation response.

Another example tangible processor-readable storage media of any preceding tangible processor-readable storage media includes the interactive conversation service satisfying the received search query based on at least a portion of the received search query identifying the interactive conversation service.

Another example tangible processor-readable storage media of any preceding tangible processor-readable storage media includes the interactive conversation service satisfying the received search query based on an identified context of the one or more search results.

Another example tangible processor-readable storage media of any preceding tangible processor-readable storage media includes communicating the assembled search results user interface page to a client device, the client device being configured to display the received search results user interface page including the interactive conversation user interface to the interactive conversation service.

An example system for integrating an interactive conversation user interface into a search results user interface page includes means for generating one or more search results responsive to a received search query. The interactive conversation service satisfies the received search query. The system further includes means for assembling the search results user interface page. The search results user interface page is configured to display the one or more search results including the interactive conversation user interface to the interactive conversation service identified by the reference.

Another example system of any preceding system supports the interactive conversation service generating a contextualized interactive conversation response based on the received search query. The interactive conversation user interface is configured to display the contextualized interactive conversation response.

Another example system of any preceding system supports the interactive conversation service generating a contextualized interactive conversation response based on the generated one or more search results. The interactive conversation user interface being configured to display the contextualized interactive conversation response.

Another example system of any preceding system includes support for the interactive conversation service satisfying the received search query based on at least a portion of the received search query identifying the interactive conversation service.

Another example system of any preceding system includes support for the interactive conversation service satisfying the received search query based on an identified query intent of the received search query.

Another example system of any preceding system includes support for the interactive conversation service satisfying the received search query based on an identified context of the one or more search results.

Another example system of any preceding system includes means for communicating the assembled search results user interface page to a client device, the client device being configured to display the received search results user interface page including the interactive conversation user interface to the interactive conversation service.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A system for integrating an interactive conversation user interface into a search results user interface page, the system comprising:
   one or more processors;
   a search service, executing on the one or more processors, that generates one or more search results responsive to a received search query, the one or more search results including a reference to an interactive conversation service, the interactive conversation service satisfying the received search query; and
   a search results user interface support manager of the search service that assembles the search results user interface page, the search results user interface page being configured to display the one or more search results including the interactive conversation user interface to the interactive conversation service identified by the reference, the one or more search results displayed in the search results user interface page including at least one contextualized interactive conversation response generated by the interactive conversation service as an interactive conversation response to submission of at least a portion of the received search query to the interactive conversation service and displayed in the interactive conversation user interface as one of the one or more search results within the search results interface page, the interactive conversation service providing direct simulated conversation between a user and the interactive conversation service; wherein the contextualized interactive conversation response is generated by the interactive conversation service before receipt of the one or more search results.

2. The system of claim 1 wherein the interactive conversation service generates the at least one contextualized interactive conversation response based on the received search query, the interactive conversation user interface being configured to display the at least one contextualized interactive conversation response.

3. The system of claim 1 wherein the interactive conversation service generates the at least one contextualized interactive conversation response based on the generated one or more search results, the interactive conversation user interface being configured to display the at least one contextualized interactive conversation response.

4. The system of claim 1 wherein the interactive conversation service satisfies the received search query based on at least a portion of the received search query identifying the interactive conversation service.

5. The system of claim 1 wherein the interactive conversation service satisfies the received search query based on an identified query intent of the received search query.

6. The system of claim 1 wherein the interactive conversation service satisfies the received search query based on an identified context of the one or more search results.

7. The system of claim 1 wherein the assembled search results user interface page is transmitted to a client device, the client device being configured to display the received search results user interface page including the interactive conversation user interface to the interactive conversation service.

8. A method for integrating an interactive conversation user interface into a search results user interface page comprising:
   generating one or more search results responsive to a received search query, the one or more search results including a reference to an interactive conversation service, the interactive conversation service satisfying the received search query; and
   assembling the search results user interface page, the search results user interface page being configured to display the one or more search results including the interactive conversation user interface to the interactive conversation service identified by the reference, the interactive conversation service providing direct simulated conversation between a user and the interactive conversation service, the one or more search results displayed in the search results user interface page including at least one contextualized interactive conversation response generated by the interactive conversation service as an interactive conversation response to submission of at least a portion of the received search query to the interactive conversation service and displayed in the interactive conversation user interface as one of the one or more search results within the search results interface page; wherein the contextualized interactive conversation response is generated by the interactive conversation service before receipt of the one or more search results.

9. The method of claim 8 wherein the interactive conversation service generates the at least one contextualized interactive conversation response based on the received search query, the interactive conversation user interface being configured to display the at least one contextualized interactive conversation response.

10. The method of claim 8 wherein the interactive conversation service generates the at least one contextualized interactive conversation response based on the generated one or more search results, the interactive conversation user interface being configured to display the at least one contextualized interactive conversation response.

11. The method of claim 8 wherein the interactive conversation service satisfies the received search query based on at least a portion of the received search query identifying the interactive conversation service.

12. The method of claim 8 wherein the interactive conversation service satisfies the received search query based on an identified query intent of the received search query.

13. The method of claim 8 wherein the interactive conversation service satisfies the received search query based on an identified context of the one or more search results.

14. The method of claim 8 further comprising:
   communicating the assembled search results user interface page to a client device, the client device being configured to display the received search results user interface page including the interactive conversation user interface to the interactive conversation service.

15. One or more tangible processor-readable storage media embodied with instructions for executing on one or more processors and circuits of a device a process for integrating an interactive conversation user interface into a search results user interface page, the process comprising:
   generating one or more search results responsive to a received search query, the one or more search results including a reference to an interactive conversation service, the interactive conversation service satisfying the received search query; and
   assembling the search results user interface page, the search results user interface page being configured to display the one or more search result including the Interactive conversation user interface to the interactive conversation service identified by the reference, the interactive conversation service providing direct simulated conversation between a user and the interactive conversation service, the one or more search results displayed in the search results user interface page including at least one contextualized interactive conversation response generated by the interactive conversation service as an interactive conversation response to submission of at least a portion of the received search query to the interactive conversation service and displayed in the interactive conversation user interface as one of the one or more search results within the search results interface page; wherein the contextualized interactive conversation response is generated by the interactive conversation service before receipt of the one or more search results.

16. The one or more tangible processor-readable storage media of claim 15 wherein the interactive conversation service generates the at least one contextualized interactive conversation response based on the received search query, the interactive conversation user interface being configured to display the at least one contextualized interactive conversation response.

17. The one or more tangible processor-readable storage media of claim 15 wherein the interactive conversation service generates the at least one contextualized interactive conversation response based on the generated one or more search results, the interactive conversation user interface being configured to display the at least one contextualized interactive conversation response.

18. The one or more tangible processor-readable storage media of claim 15 wherein the interactive conversation service satisfies the received search query based on at least a portion of the received search query identifying the interactive conversation service.

19. The one or more tangible processor-readable storage media of claim 15 wherein the interactive conversation service satisfies the received search query based on an identified context of the one or more search results.

20. The one or more tangible processor-readable storage media of claim 15 wherein the process further comprises:
communicating the assembled search results user interface page to a client device, the client device being configured to display the received search results user interface page including the interactive conversation user interface to the interactive conversation service.

21. The system of claim 1 wherein the contextualized interactive conversation response is displayed in the interactive conversation user interface as one of the one or more search results within the search results interface page without interaction with the interactive conversation service by the user subsequent to receipt of the one or more search results.

* * * * *